US008268268B2

(12) United States Patent
Lu et al.

(10) Patent No.: US 8,268,268 B2
(45) Date of Patent: Sep. 18, 2012

(54) RAPID METHOD FOR PREPARING TITANIA OR PRECURSOR THEREOF WITH CONTROLLABLE MICROPOROUS-MESOPOROUS STRUCTURE

(75) Inventors: Xiaohua Lu, Nanjing (CN); Yaxin Zhou, Nanjing (CN); Chang Liu, Nanjing (CN); Xin Feng, Nanjing (CN); Zhuhong Yang, Nanjing (CN); Changsong Wang, Nanjing (CN)

(73) Assignees: Nanjing University of Technology, Nanjing, Jiangsu (CN); Nanjing Taiwei Technology Co., Ltd., Nanjing New and Hi-Tech Zone, Nanjing, Jiangsu (CN)

( * ) Notice: Subject to any disclaimer, the term of this patent is extended or adjusted under 35 U.S.C. 154(b) by 115 days.

(21) Appl. No.: 12/672,139

(22) PCT Filed: Aug. 7, 2007

(86) PCT No.: PCT/CN2007/070428
§ 371 (c)(1),
(2), (4) Date: Feb. 4, 2010

(87) PCT Pub. No.: WO2009/018700
PCT Pub. Date: Feb. 12, 2009

(65) Prior Publication Data
US 2011/0033371 A1 Feb. 10, 2011

(51) Int. Cl.
*C01G 23/047* (2006.01)
*C01G 23/04* (2006.01)
*C01G 23/08* (2006.01)

(52) U.S. Cl. ............ 423/84; 423/85; 423/610; 423/641; 502/350

(58) Field of Classification Search ............... 423/84, 423/85, 203, 610–613, 641; 502/350
See application file for complete search history.

(56) References Cited

U.S. PATENT DOCUMENTS

| 6,191,067 B1 * | 2/2001 | Koike et al. | 502/350 |
| 6,268,307 B1 * | 7/2001 | DeFilippi et al. | 502/427 |
| 6,306,796 B1 * | 10/2001 | Suzue et al. | 502/350 |
| 6,827,922 B2 * | 12/2004 | Sawabe et al. | 423/610 |

FOREIGN PATENT DOCUMENTS

JP 2006-182575 * 7/2006

OTHER PUBLICATIONS

Ming He, Xiao-Hua Li, Xin Feng, Lei Yu and Zhu-Hong Yang, "A simple approach to mesoporous fibrous titania from potassium dititanate," Chem. Commun. (2004), pp. 2202-2203.*

* cited by examiner

*Primary Examiner* — Steven Bos
*Assistant Examiner* — Diana J Liao
(74) *Attorney, Agent, or Firm* — Global IP Services; Tianhua Gu

(57) ABSTRACT

A method for preparing titania or precursor thereof with a controllable structure from micropore to mesopore is provided. The method is characterized in that the alkali metal titanate as raw material is reacted for 0.5~72 hours in the wet atmosphere with humidity of 2~100% at temperature of 20~250° C., then washed with water or acid, finally performed by air roasting or solvent thermal treatment. The method has advantages that the raw material is easy to be obtained, the conditions and preparation are controllable, the pore structure may be adjusted from micropore to mesopore, crystal mixing and doping are easy, reacting time is short, preparing cost is low, and the said method is suitable for large scale production and so on. The most probable aperture of titanium oxide or precursor thereof with a controllable structure from micropore to mesopore is in the range of 1~20 nm, the pore volume thereof is in the range of 0.05~0.4 cm$^3$/g, and the specific surface area thereof is more than 30 m$^2$/g. The titania is at least one of anatase-phase titania, TiO$_2$(B)-phase titania and rutile-phase titania.

8 Claims, No Drawings

RAPID METHOD FOR PREPARING TITANIA OR PRECURSOR THEREOF WITH CONTROLLABLE MICROPOROUS-MESOPOROUS STRUCTURE

CROSS REFERENCE TO RELATED PATENT APPLICATION

The present application is the U.S. national stage of PCT/CN2007/070428 filed on Aug. 7, 2007, which claims the priority of the PCT/CN2007/070428 filed on Aug. 7, 2007, which application is incorporated herein by reference.

BACKGROUND OF THE INVENTION

1. Field of the Invention

The present invention relates to the technical field of preparing an inorganic porous catalytic material. Specifically, the present invention relates to a method for preparing titania or precursor thereof with microporous-mesoporous structure, which has the advantages of controllable pore structure parameters, such as the most probable pore size, specific surface area and pore volume, simple and controllable synthesis conditions, and short synthesis time.

2. Related Art

The pore structure is one of the important indexes of catalyst. It is generally believed that it is necessary to accelerate the diffusion rate or try to shorten the diffusion path to improve the utilization rate of the active site of the hole. However, the pore sizes of the porous catalysts are different for different reactants and reaction conditions in practice. On one hand, increasing the pore size of the catalyst not only can enlarge the region into which the functional groups such as metal oxide and metal cluster with large molecule weight and volume enter, but also provide a larger place for the ion and atom cluster into the pore path, thus facilitating the diffusion of the reactant and solvent molecule in the pore path, thereby improving the reaction conversion and catalyst performance. On the other hand, the catalyst with small pore size has the characteristic of shape-selective reaction, thus inhibiting other side reactions in the reaction system, thereby improving the reaction specificity and selectivity greatly. The pore volume and specific surface area are also the important physical properties of the porous catalyst. However, how the pore volume and specific surface area impact the catalyst activity is unclear till now: generally, increasing the pore volume and specific surface area of the catalyst is beneficial for the activity; but some catalysts with small pore volumes and specific surface areas have high activities. Therefore, it seems particularly important to prepare the porous material suitable for the actual reaction system.

Porous titania, especially microporous and mesoporous titania attract particular attention due to high specific surface area and high activity in hydrogen storage, fuel cell, photocatalytic degradation of organic materials, solid acid catalysis etc., due to its. There are also various studies on the application of microporous-mesoporous titanic acid in lithium ion battery, environmental monitoring, photocatalysis, and organic catalysis. However, how to obtain microporous-mesoporous titania or precursor thereof with controllable pore structure has always been a problem. 1) When adjusting the pore structure within a narrow range by varying conditions of sol-gel reaction or post-treatment, such as pH value, water amount, application of magnetic field, microwave and roasting temperature, the conditions must be controlled very precisely. 2) If adding templating agents with different sizes or surfactant, phosphoric acid, nitric acid, aqueous ammonia etc. as catalysts or structure directing agents in the preparation of titania sol, this process is merely suitable for a small scale preparation, furthermore, treatment of these catalysts may cause environmental pollution. 3) As titania or precursor thereof with high specific surface area cannot be obtained from titanate with routine or conventional methods, according to an intercalation or reassembly method employed by Sasaki et al., titanate or titania is used as raw material, alumina or organic ammonium salt is used as supporting material, and the pore structure is controlled by varying amounts of these materials, but the raw material of this method is expensive, and the scheme is complex. 4) According to the finding of Wellenberg et al., the specific surface area of the product titania or precursor thereof can be increased effectively, when a small amount of potassium dititanate is present in the titanate raw material, but no further study has been conducted.

To solve the above problems, the inventors have developed a new scheme (ZL 03158274.5) for preparing mesoporous titania with high specific surface area with potassium titanate as raw material. This method is different from the conventional sol-gel method, and has the advantages that the raw materials are cheap, no templating agent or surfactant is added, the production cost is low, and the process is simple and can be easily enlarged. According to this method, as raw material, a titanium compound and a potassium compound are mixed uniformly at the molar ratio of $TiO_2/K_2O=1$-4, in which the titanium compound and the potassium compound are converted into $TiO_2$ and $K_2O$. The mixture is sintered at 600-1100° C. for more than 30 min to obtain the product potassium titanate containing the potassium dititanate crystal. After being dispersed in water, the sintered product is added into alkaline solution (the volume ratio of the solution and product was 1-50) with a pH value of equal to or higher than 8 or a $K^+$ solution having a concentration of higher than 1 mol/L and reacted for more than 4 h at 20-100° C. Then, the reaction solution is subjected to hydration treatment in an acid solution with a pH value of lower than 5, to give a hydrated product with a potassium content of lower than 5 wt % based on the product weight and a specific surface area of higher than 100 $m^2/g$). After being dehydrated by thermal treatment, could the product crystallize into hydrated titania, octatitanic acid, Monoclinic-type titania, anatase-type titania, rutile-type titania, or a mixture of more than one titania above. The specific surface area of this product is higher than 50 $m^2/g$, and the crystal form is crystal whisker with a diameter or equivalent diameter of 0.1-10 μm.

However, this method still has some disadvantages. 1) The pore size of this product merely remains at about 10 nm and cannot be controlled as needed, and nor can be diminished into the microporous range, furthermore, the adjusting of the pore size within a narrow range is realized on the basis of the expense of the degree of crystallinity. 2) As the aqueous solution is necessarily used, an excessively long production cycle is caused, e.g. 7 to 10 days for the hydration process, and the amount and composition (pH, ion concentration, etc.) are required to be controlled stringently. 3) As the specific surface area of the product is regulated mainly by varying the sintering condition in the earlier stage, the process gets complicated, and is influenced significantly by uncertain factors, such as temperature field distribution, thus the product quality is unstable. 4) The source of the raw material is limited, because the raw material is required to contain potassium dititanate. If the above problems can be solved, the industrial production of titania with high specific surface area can be realized actually.

SUMMARY OF THE INVENTION

The present invention is directed to a rapid method for preparing titania or precursor thereof with controllable microporous-mesoporous structure. This method has the advantages of controllable pore structure parameters, simply and controllable synthesis conditions, and short synthesis time.

The object of the present invention can be achieved by following measures.

The present invention provides a rapid method for preparing titania or precursor thereof with controllable microporous-mesoporous structure. The method is characterized in that: the most probable pore size of the titania or precursor thereof is 1-20 nm, the pore volume is 0.05-0.4 cm$^3$/g, and the specific surface area is higher than 30 m$^2$/g. In this method, alkali metal titanate is used as raw material, after reacting in a moisture atmosphere with humidity of 2-100% at a temperature of 20-250° C. for 0.5-72 h, is washed with water or an acid solution, and finally performed by conventional methods such as air roasting or solvent thermal treatment.

The titania with microporous-mesoporous structure of the present invention can be at least one of anatase-phase titania, TiO$_2$ (B)-phase titania, and rutile-phase titania.

The titania precursor with microporous-mesoporous structure of the present invention can be at least one of dititanic acid, trititanic acid, tetratitanic acid, hextitanic acid, octatitanic acid, and amorphous titanic acid.

The object of the present invention can also be achieved by following measures.

The alkali metal titanate is at least one of sodium monotitanate, sodium trititanate, potassium dititanate, potassium tetratitanate, and potassium octatitanate.

The moisture atmosphere can be produced from at least one of normal water vapor, alcohol organics-water vapor, and soluble inorganic salt-water vapor.

The acid solution is at least one of hydrochloric acid solution, sulfuric acid solution, nitric acid solution, formic acid solution, acetic acid solution, and oxalic acid solution.

The solvent thermal treatment is carried out in at least one solution of water, methanol, ethanol, ethylene glycol, 1-propanol, 2-propanol, 1,2-propylene glycol, 1,3-propylene glycol, glycerol, n-butanol, isobutanol, tert-butyl alcohol, acetone, furfuryl alcohol, a solution of glucose, and a solution of sucrose.

The alcohol organics is at least one of methanol, ethanol, ethylene glycol, 1-propanol, 2-propanol, 1,2-propylene glycol, 1,3-propylene glycol, glycerol, n-butanol, isobutanol, tert-butyl alcohol, acetone, furfuryl alcohol, glucose, and sucrose. The soluble inorganic salt is at least one of halide, carbonate, nitrate and sulfate of alkali metals and alkaline earth metals, including sodium fluoride, potassium fluoride, sodium chloride, potassium chloride, magnesium chloride, calcium chloride, sodium carbonate, potassium carbonate, sodium nitrate, potassium nitrate, magnesium nitrate, calcium nitrate, sodium sulfate, potassium sulfate, and magnesium sulfate.

The present invention has the following advantages.

1. The reaction time is short, and the energy consumption is low.

2. The preparation conditions and process are simple and controllable, and the sources of raw materials re abundant, thus facilitating the scale production.

3. The pore size of the product titania or precursor thereof can be adjusted within the microporous-mesoporous range by controlling temperature, humidity and reaction time, and the pore volume and specific surface area can also be regulated to satisfy the requirements of catalyst for different reactions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

No drawings

DETAILED DESCRIPTION OF THE INVENTION

The pore structure and crystal form of titania or precursor thereof of the present invention is controllable, and the preparation method has the advantages that the raw material is easily available, the process is rapid, simple, and controllable. Hereinafter, the present invention is further described with reference to the embodiments.

Embodiment 1

Potassium tetratitanate prepared by the reaction of amorphous titanium compound and potassium compound was used as raw material, reacted in a glycerol-water vapor atmosphere with humidity of 15% at 200° C. for 6 h, then washed with water, and finally roasted in the air, to get the titania with microporous-mesoporous structure. The most probably pore size of the product is 3 nm, specific surface area is 85 m$^2$/g, pore volume is 0.1 cm$^3$/g, and the crystal form is a mixture of tetratitanic acid, anatase-type titania, and TiO$_2$(B)-type titania.

The other embodiments are shown in Table 1.

TABLE 1

Raw materials, preparation conditions and structure performances of the product of Embodiments 2-8

| The other embodiments | Raw materials | Raw materials and preparation conditions | | | | | |
|---|---|---|---|---|---|---|---|
| | | Reaction temperature (° C.) | Reaction humidity (%) | Reaction atmosphere | Reaction time (h) | Washing solutions | Post-treatment media |
| Embodiment 2 | 2TiK + 8TiK | | 100 | normal water vapor | 3 | hydrochloric acid | glycerol |
| Embodiment 3 | 1TiNa | 250 | 2 | calcium nitrate-water vapor | 48 | sulfuric acid | methanol-ethanol |
| Embodiment 4 | 3TiNa + 4TiK | 60 | 50 | methanol-ethanol-water vapor | 0.5 | hydrochloric acid + acetic acid | acetone |

TABLE 1-continued

Raw materials, preparation conditions and structure performances of the product of Embodiments 2-8

| Embodiment 5 | 2TiK | 180 | 30 | sodium chloride-water vapor | 72 | formic acid | ethylene glycol-aqueous solution |
|---|---|---|---|---|---|---|---|
| Embodiment 6 | 3TiNa | 80 | 80 | acetone-water vapor | 24 | nitric acid | sucrose-aqueous solution |
| Embodiment 7 | 1TiNa + 4TiK | 150 | 25 | sucrose-water vapor | 12 | formic acid + oxalic acid | water |
| Embodiment 8 | 2TiK + 4TiK | 180 | 75 | magnesium chloride-potassium sulfate-water vapor | 36 | water | methanol |

| | Structure performances of the product | | | |
|---|---|---|---|---|
| The other embodiments | Most probably pore size (nm) | Specific surface area ($m^2/g$) | Pore volume ($cm^3/g$) | Crystal form |
| Embodiment 2 | 20 | 38 | 0.4 | $TiO_2(B)$ + 8TiH |
| Embodiment 3 | 1 | 237 | 0.12 | Amorphous |
| Embodiment 4 | 16 | 46 | 0.26 | Anatase + Rutile |
| Embodiment 5 | 9 | 52 | 0.32 | Anatase + 2TiH |
| Embodiment 6 | 5 | 126 | 0.1 | $3TiH \cdot 1.5H_2O$ |
| Embodiment 7 | 8 | 73 | 0.14 | 8TiH + 4TiH |
| Embodiment 8 | 12 | 62 | 0.17 | $TiO_2(B)$ + Anatase |

Note:
1. In the column of raw materials, 2TiK represents potassium dititanate, 8TiK represents potassium octatitanate, 1TiNa represents sodium monotitanate, 3TiNa represents sodium trititanate, and 4TiK represents potassium tetratitanate.
2. In the column of crystal form, 8TiH represents octatitanic acid, 2TiH represents dititanic acid, 3TiH represents trititanic acid, 4TiH represents tetratitanic acid, $3TiH \cdot 1.5H_2O$ represents trititanic acid with 1.5 molecules of water of crystallization, Amorphous represents amorphous titanic acid, $TiO_2(B)$ represents $TiO_2(B)$-type titania, Anatase represents anatase-type titania, and Rutile represents rutile-type titania.

Comparative Embodiment 1

According to the reference, as raw material, potassium dititanate was immersed in a small amount of liquid water at room temperature for 72 h, then washed with hydrochloric acid, and finally roasted in the air, to get titania. The most probable pore size of the product is 10 nm and cannot be adjusted, the specific surface area is 30 $m^2/g$, the pore volume is 0.04 $cm^3/g$, and the crystal form is the mixture of amorphous titanic acid and anatase-type titania.

Comparative Embodiment 2

As raw material, potassium tetratitanate was treated in the ethylene glycol-water vapor atmosphere (temperature: 280° C., humidity: 1%) for 84 h, then washed with water, and finally treated with glycerol, to get titania without any micropore or mesopore. The specific surface area of the product is 18 $m^2/g$, the pore volume is 0.01 $cm^3/g$, and the crystal form is the mixture of octatitanic acid containing two molecules of water of crystallization and $TiO_2(B)$-type titania.

Comparative Embodiment 3

As raw material, the mixture of sodium trititanate and potassium tetratitanate were reacted in the magnesium chloride-water vapor atmosphere (temperature: 200° C., humidity: 30%) for 10 min, then washed with oxalic acid, and finally roasted in the air, to get titania with a few pores. The most probable pore size of the product is 32 nm, the specific surface area is 15 $m^2/g$, the pore volume is 0.015 $cm^3/g$, and the crystal form is the mixture of anatase-type titania and rutile-type titania.

Comparative Embodiment 4

With barium titanate as the raw material, at the reaction conditions being the same as those in Embodiment 6, a product having no pore path structure was obtained. The specific surface area of the product is 8 $m^2/g$, the pore volume is 0 $cm^3/g$, and the crystal form still is barium titanate.

It can be seen from the embodiments and the comparative embodiments that, titania or precursor thereof of the present invention has the advantages that the sources of the raw materials are wide and adequate, the preparation conditions and process are simple and controllable, the reaction time is short, the pore structure can be adjusted within the microporous-mesoporous range as needed, mixing or doping of crystal forms is relatively convenient, and so on, thus being far superior to the prior art. According to the present invention, titania or precursor thereof with different pore structure performances can be prepared rapidly by adjusting the reaction temperature, humidity, atmosphere, and post-treatment conditions. Additionally, the method of the present invention is very suitable for large scale production and various applications, due to the simple process and low operation cost.

What is claimed is:

1. A rapid method for preparing titania or precursor thereof with controllable microporous-mesoporous structure comprising following steps:
    (a) treating alkali metal titanate in a moisture atmosphere, which is produced from at least one of normal water vapor, alcohol organic compound-water vapor, and soluble inorganic salt-water vapor with a relative humidity of 2-100% at a temperature of 20-250° C. for 0.5-72 hours;
    (b) washing the treated alkali metal titanate with water or an acid solution, and
    (c) heating the alkali metal titanate obtained from the step (b) in air or an organic solvent to produce titania or a precursor thereof with a pore size of 1-20 nm, a pore volume of 0.05-0.4 $cm^3/g$, and a specific surface area of greater than 30 $m^2/g$.

2. The method according to claim 1, wherein the titania is at least one of anatase titania, $TiO_2(B)$ titania, and rutile titania.

3. The method according to claim 1, wherein the titania precursor is at least one of dititanic acid, trititanic acid, tetratitanic acid, hextitanic acid, octatitanic acid, and amorphous titanic acid.

4. The method according to claim 1, wherein the alkali metal titanate is at least one of sodium monotitanate, sodium trititanate, potassium dititanate, potassium tetratitanate, and potassium octatitanate.

5. The method according to claim 1, wherein the alcohol organic compound is at least one of methanol, ethanol, ethylene glycol, 1-propanol, 2-propanol, 1,2-propylene glycol, 1,3-propylene glycol, glycerol, n-butanol, isobutanol, tert-butyl alcohol, acetone, furfuryl alcohol, glucose, and sucrose; and the soluble inorganic salt is at least one of halide, carbonate, nitrate and sulfate of alkali metals and alkaline earth metals.

6. The method according to claim 5, wherein the soluble inorganic salt is sodium fluoride, potassium fluoride, sodium chloride, potassium chloride, magnesium chloride, calcium chloride, sodium carbonate, potassium carbonate, sodium nitrate, potassium nitrate, magnesium nitrate, calcium nitrate, sodium sulfate, potassium sulfate, or magnesium sulfate.

7. The method according to claim 1, wherein the acid solution is at least one of hydrochloric acid solution, sulfuric acid solution, nitric acid solution, formic acid solution, acetic acid solution, and oxalic acid solution.

8. The method according to claim 1, wherein the organic solvent in step (c) is at least one solution of methanol, ethanol, ethylene glycol, 1-propanol, 2-propanol, 1,2-propylene glycol, 1,3-propylene glycol, glycerol, n-butanol, isobutanol, tert-butyl alcohol, acetone, furfuryl alcohol, glucose, and sucrose.

* * * * *